US006384134B1

(12) United States Patent
Hall et al.

(10) Patent No.: US 6,384,134 B1
(45) Date of Patent: May 7, 2002

(54) POLY(ALKENYL-CO-MALEIMIDE) AND MALEATED POLYALKYLENE GRAFTED WITH GRAFTING AGENT, AND EPOXY POLYMER

(75) Inventors: James E. Hall, Mogadore; Xiaorong Wang, Akron, both of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/586,823

(22) Filed: Jun. 5, 2000

(51) Int. Cl.[7] .................. C08L 25/08; C08L 51/06; C08L 63/00
(52) U.S. Cl. .................. 525/65; 523/436
(58) Field of Search .................. 525/65; 523/436

(56) References Cited

U.S. PATENT DOCUMENTS

| 2,725,367 A | 11/1955 | Niederhauser et al. | |
|---|---|---|---|
| 2,971,934 A | 2/1961 | Brown et al. | |
| 3,244,664 A | 4/1966 | Zelinski et al. | |
| 3,281,383 A | 10/1966 | Zelinski et al. | |
| 3,297,654 A | 1/1967 | Barr et al. | |
| 3,414,551 A | 12/1968 | Reid et al. | |
| 3,428,596 A | 2/1969 | Strand et al. | |
| 3,480,580 A | 11/1969 | Joyner et al. | |
| 3,481,910 A | 12/1969 | Brunson et al. | |
| 3,492,227 A | 1/1970 | Kolaian | 252/8.5 |
| 3,528,936 A | 9/1970 | Kent et al. | |
| 3,577,365 A | 5/1971 | Folzenlogen et al. | |
| 3,594,452 A | 7/1971 | De La Marre et al. | |
| 3,751,378 A | 8/1973 | Cowperthwaite et al. | |
| 3,761,458 A | 9/1973 | Holler et al. | |
| 3,796,687 A | 3/1974 | Collette et al. | |
| 3,840,449 A | 10/1974 | Furukawa et al. | 204/159.24 |
| 3,862,265 A | 1/1975 | Steinkamp et al. | 264/176 R |
| 3,970,608 A | 7/1976 | Furukawa et al. | 526/19 |
| 3,985,830 A | 10/1976 | Fetters et al. | 526/21 |
| 3,998,907 A | 12/1976 | Di Giulio | |
| 4,015,612 A | 4/1977 | Pavlik et al. | 526/14 |
| 4,017,669 A | 4/1977 | Collette et al. | 526/169 |
| 4,087,485 A | 5/1978 | Huff | |
| 4,104,332 A | 8/1978 | Zelinski | 526/20 |
| 4,132,531 A | 1/1979 | Cummings et al. | 44/63 |
| 4,139,417 A | 2/1979 | Marie et al. | 252/51.5 A |
| 4,151,336 A | 4/1979 | Sackmann et al. | 526/15 |
| 4,151,337 A | 4/1979 | Kanoh et al. | 526/116 |
| 4,287,314 A | 9/1981 | Fava | 525/130 |
| 4,304,886 A | 12/1981 | Bean et al. | 525/314 |
| 4,374,951 A | 2/1983 | Lee et al. | 525/73 |
| 4,404,321 A | 9/1983 | Abolins et al. | 525/68 |
| 4,404,322 A | 9/1983 | Saito et al. | 525/74 |
| 4,408,010 A | 10/1983 | Le-Khac | 525/73 |
| 4,423,196 A | 12/1983 | Arlt et al. | 525/72 |
| 4,427,828 A | 1/1984 | Hergenrother et al. | 525/66 |
| 4,502,229 A | 3/1985 | Kitzman | 34/56 |
| 4,506,056 A | 3/1985 | Gaylord | 524/445 |
| 4,540,753 A | 9/1985 | Cozewith et al. | 526/88 |
| 4,585,824 A | 4/1986 | Uchida et al. | 524/494 |
| 4,605,700 A | 8/1986 | Le-Khac | 525/73 |
| 4,683,275 A | 7/1987 | Kato et al. | 526/262 |
| 4,728,463 A | 3/1988 | Sutker et al. | 525/74 |
| 4,732,928 A | 3/1988 | Mizushiro et al. | 524/505 |
| 4,735,992 A | 4/1988 | Nogues | 525/64 |
| 4,771,097 A | 9/1988 | Sackmann et al. | 524/549 |
| 4,772,657 A | 9/1988 | Akiyama et al. | 524/504 |
| 4,889,896 A | 12/1989 | Canova et al. | 525/375 |
| 4,893,055 A | 1/1990 | Fuzzi et al. | 525/46 |
| 4,912,144 A | 3/1990 | McCready | 523/522 |
| 4,921,910 A | 5/1990 | Lunt et al. | 525/74 |
| 4,931,502 A | 6/1990 | McCready | 525/64 |
| 4,996,262 A | 2/1991 | Pyke et al. | 525/177 |
| 5,008,324 A | 4/1991 | Killgoar, Jr. et al. | 524/504 |
| 5,034,449 A | 7/1991 | Mallikarjun | 524/504 |
| 5,037,924 A | 8/1991 | Tazi et al. | 526/272 |
| 5,082,913 A | 1/1992 | Tazi et al. | 526/272 |
| 5,122,161 A | 6/1992 | Benfaremo et al. | 44/348 |
| 5,126,403 A | 6/1992 | Graiver et al. | 525/58 |
| 5,156,920 A | 10/1992 | Aycock et al. | 428/517 |
| 5,202,384 A | 4/1993 | Pyke et al. | 525/167 |
| 5,212,227 A | 5/1993 | Sakazume et al. | 524/504 |
| 5,219,628 A | 6/1993 | Hathaway et al. | 525/64 |
| 5,225,498 A | 7/1993 | Sorathia et al. | 525/454 |
| 5,244,971 A | 9/1993 | Jean-Marc | 525/64 |
| 5,300,569 A | 4/1994 | Drake et al. | 525/78 |
| 5,318,854 A | 6/1994 | Hamersma et al. | 525/64 |
| 5,356,953 A | 10/1994 | Harada et al. | 523/171 |
| 5,373,048 A | 12/1994 | Witzeman et al. | 524/458 |
| 5,414,044 A | 5/1995 | Moriya et al. | 525/74 |
| 5,432,662 A | 7/1995 | Kato et al. | 428/35.7 |
| 5,472,741 A | 12/1995 | Sackmann et al. | 525/327.7 |
| 5,489,657 A | 2/1996 | Sue et al. | 525/53 |
| 5,494,964 A | 2/1996 | Meichsner et al. | 525/10 |
| 5,494,981 A | 2/1996 | Gorodisher et al. | 525/504 |
| 5,532,317 A | 7/1996 | Shinmura et al. | 525/73 |
| 5,536,774 A | 7/1996 | Segatta | 524/505 |
| 5,548,031 A | 8/1996 | Doi | 525/327.4 |

(List continued on next page.)

FOREIGN PATENT DOCUMENTS

| AU | 47913/85 | 4/1986 |
|---|---|---|
| CA | 702610 | 1/1965 |
| DE | 3430802 A1 | 3/1986 |
| DE | 42 25 875 A1 | 2/1994 |
| DE | 42 39437 A1 | 5/1994 |

(List continued on next page.)

OTHER PUBLICATIONS

L.E. Colleman, Jr., J.F. Bork, and H. Donn, Jr., J. Org. Chem., 24, 185 (1959) Reaction of Primary Aliphatic Amines with Maleic Anhydride.

(List continued on next page.)

Primary Examiner—Robert E. L. Sellers
(74) Attorney, Agent, or Firm—David G. Burleson; Scott A. McCollister

(57) ABSTRACT

A polymer gel composition useful in the fabrication of a vibration damping material comprises a maleated polyalkylene grafted via a grafting agent such as a diamine to a poly(alkenyl-co-maleimide), an epoxy polymer and, optionally, an extender such as a phthalate oil.

20 Claims, No Drawings

U.S. PATENT DOCUMENTS

| | | |
|---|---|---|
| 5,585,434 A | 12/1996 | DeNicola, Jr. et al. ....... 525/67 |
| 5,585,436 A | 12/1996 | Niessner et al. ............ 525/105 |
| 5,602,200 A | 2/1997 | Wissmann .................... 525/66 |
| 5,618,881 A | 4/1997 | Hojabr ........................ 525/64 |
| 5,634,122 A | 5/1997 | Loucks et al. .............. 395/608 |
| 5,637,410 A | 6/1997 | Bonner et al. ................ 525/66 |
| 5,651,927 A | 7/1997 | Auda et al. ................. 525/242 |
| 5,652,307 A | 7/1997 | Niessner et al. ............ 525/101 |
| 5,654,364 A | 8/1997 | Bates et al. .................... 525/98 |
| 5,655,820 A | 8/1997 | Kervagoret .............. 303/117.1 |
| 5,658,985 A | 8/1997 | Eichenauer et al. .......... 525/83 |
| 5,665,820 A | 9/1997 | Liestner et al. ............... 525/66 |
| 5,670,006 A | 9/1997 | Wilfong et al. ............. 156/236 |
| 5,684,122 A | 11/1997 | Inoue et al. ................ 528/363 |
| 5,691,411 A | 11/1997 | Khouri et al. ................ 525/64 |
| 5,710,228 A | 1/1998 | Krause et al. .............. 526/262 |
| 5,776,234 A | 7/1998 | Schilling ................ 252/311.5 |
| 5,783,630 A | 7/1998 | Evans et al. ................... 525/74 |
| 5,798,413 A | 8/1998 | Spelthann et al. ........... 525/66 |
| 5,798,414 A | 8/1998 | Mishima et al. .............. 525/77 |
| 5,821,032 A | 10/1998 | DoMinh ..................... 522/63 |
| 5,869,695 A | 2/1999 | Ulmer et al. ............... 548/545 |
| 5,883,188 A | 3/1999 | Hwang et al. ................ 525/71 |
| 5,905,116 A | 5/1999 | Wang et al. ................... 525/74 |
| 5,912,296 A | 6/1999 | Wang et al. ................ 524/534 |
| 5,965,666 A | 10/1999 | Koo et al. ..................... 525/66 |

FOREIGN PATENT DOCUMENTS

| | | |
|---|---|---|
| DE | 42 41 538 A1 | 6/1994 |
| EP | 0 177 401 AI | 4/1986 |
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 952151 | 3/1964 |
| JP | 6-248017 | 9/1954 |
| JP | 60-243102 | 12/1985 |
| JP | 6-56921 | 3/1994 |
| JP | 8-255901 | 10/1996 |
| WO | WO 96/23007 | 8/1996 |
| WO | WO 97/00898 | 1/1997 |

OTHER PUBLICATIONS

A. Matsumoto, Y. Oki, and T. Otsu, Polymer J., 23(3), 201 (1991). Sythesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo, Macromol. Rapid Commun., 17, 835(1996). Synthesis and Photocrosslinking of Maleimide-Type Polymers.

W. Lee, and G. Hwong, J. Appl. Polym. Sci., 59, 599 (1996). Polysulfobetaines and Corresponding Cationic Polymers. IV. Synthesis and Aqueous Solution Properties of Cationic Poly (MIQSDMAPM).

I. Vermeesch, and G. Groeninckx, J. Appl. Polym. Sci., 53, 1365(1994). Chemical Modification of Poly(styrene–comaleic anhydride) with primary N–Alkylamines by Reactive Extrusion.

US 6,384,134 B1

POLY(ALKENYL-CO-MALEIMIDE) AND MALEATED POLYALKYLENE GRAFTED WITH GRAFTING AGENT, AND EPOXY POLYMER

FIELD OF THE INVENTION

The present invention relates to the development of high damping polymers with superior adhesion properties, high-temperature stability, mechanical strength and moldability.

BACKGROUND OF THE INVENTION

The polymerization of isobutylene and maleic anhydride is known, as is the polymerization of styrene and maleic anhydride, and alkyl vinyl ethers and maleic anhydride. These polymerization techniques are carried out by free radical initiation. Further, imidization between a maleic anhydride and a primary amine group is a commonly known chemical reaction. It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. While immiscibility may not be a problem since it may be desirable to have a two-phase structure, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

SUMMARY OF THE INVENTION

The present invention is a polymer gel composition comprising a polymer including an anhydride unit and an alkenyl unit; a crosslinking agent; a maleated polyalkylene; an extender; and an epoxy.

According to one embodiment of this invention, a blend of a maleated polyalkylene and a poly(alkenyl-co-maleimide) and an epoxy polymer that is useful in producing high damping and soft materials with good adhesion properties is provided. The polymer gel can be formed by reacting the polymeric constituents with a grafting agent, followed by mixture with an epoxy polymer.

It is an advantage of the invention to produce a polymer composition that exhibits improved properties such as tensile strength, maximum elongation, tear strength, damping properties, high temperature stability, good adhesion, and the like, with emphasis on good adhesion. More particularly, the present inventive grafted polymer compositions combine with an epoxy polymer to improve the tensile strength, tear strength, damping properties, high-temperature compression set, and adhesion of the centipede polymer.

DETAILED DESCRIPTION OF THE INVENTION

The polymer gel composition of the present invention contains: 0.5–200 parts by weight of a grafted polymer of a poly(alkenyl-co-maleimide) having at least one maleated polyalkylene segment grafted thereto through the at least one functional linkage formed by a cross-linking reaction with a diamine grafted agent; and 0 to 1000 parts by weight of a hyperbranched epoxy polymer. It is understood that the general term poly(alkenyl-co-maleimide) is an inclusive term which includes poly(alkenylbenzne-co-maleimide), poly($R_1R_2$ethylene-co-maleimide), and poly(alkylvinyl ether-co-maleimide).

The poly(alkenyl-co-maleimide) is a "centipede" polymer formed by imidizing a poly(alkenyl-co-maleic anhydride) with a primary amine. The "centipede" polymer has a high molecular weight spine connected with many relatively short side chains formed from the addition of the primary amines. The length of the main chain usally equals or is longer than the entanglement length, which is herein defined theoretically as an order of magnitude of 100 repeating units, while the length of the side chains is smaller than the entanglement length.

The preferred alkenyl monomer units of the poly(alkenylbenzne-co-maleimide) "centipede" are any one or combination of styrene, α-methyl styrene, 1-vinyinaphthalene, 2-vinylnaphthalene, 1-α-methyl-vinyinaphthalene, 2-α-methyl vinylnaphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl aromatic hydrocarbons. The preferred vinyl aromatic hydrocarbons are either styrene or α-methylstyrene. The terms "alkenyl benzene" and "vinyl aromatic" are understood to be interchangeable as used herein.

The preferred $R_1R_2$ethylene contributed monomer units of the poly($R_1R_2$ethylene-co-maleimide) are any alkene such as ethylene, propylene, butylene, isobutylene, pentene, hexene, heptene, etc., as well as any di- or tri- alkene, with preference given to isobutylene.

The preferred alkyl vinyl ether contributed monomer units of the poly(alkylvinyl ether-co-maleimide) are any alkylvinyl ether such as methylvinyl ether, ethylvinyl ether, propylvinyl ether, butylvinyl ether, and any other alkyl vinyl ether wherein the number of carbons in the alkyl substituent is not greater than about 12.

The poly(alkenyl-co-maleimides) described herein are subsequently graft-reacted through a difunctional linking or grafting agent to a maleated polyalkylene to yield a maleated polymer having at least one polyalkylene segment grafted thereto through at least one functional linkage thus formed. The alkylene moiety of the polyalkylene is selected from the group consisting of ethylene, propylene, and mixtures thereof The preferred polyalkylene is polypropylene.

The maleated polypropylene may be any of the conventionally known polypropylene compounds that are subsequently maleated by methods known in the art. The polypropylene grafted segment or segments have molecular weights $M_W$ of about 10,000 up to about 10,000,000, or higher, preferably about 20,000 to about 300,000.

The crystallinity, or tacticity, of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. Generally, the polypropylene is substantially free of ethylene. However, under certain circumstances small amounts of ethylene, on the order of less than about 10% by weight, may be incorporated. Furthermore, in certain instances the polypropylene contains small amounts of ethylene in copolymers known as "reactor copolymers." Thus, it is within the scope of the invention that the grafted polypropylenes contain minor amounts of ethylene, both as part of the ethylene-propylene segments and as polyethylene segments.

The maleated polypropylene of this invention contains from about 0.01 wt. % incorporated maleic anhydride, based upon the weight of the maleated polypropylene, up to about 5 wt. %. Preferably the maleic anhydride content will be from about 0.01 to about 2 wt. %, most preferably about 0.03 to about 0.2 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental effects on the subsequent reaction of the poly(alkenyl-co-maleimide) with the maleated polyalkylene.

The poly(alkenyl-co-maleimide) of the present invention is formed by reacting a poly(alkenyl-co-maleic anhydride) in the presence of a mono-primary amine at temperatures from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge, or in sequential partial charges into the reactor containing a charge of poly(alkenyl-co-maleic anhydride). Preferably the primary amine is charged in ratio between 0.8 to 1.0 moles of amine per monomer contributed units of maleic anhydride in the poly(alkenyl-co-maleic anhydride).

Suitable primary amines include, but are not limited to: alkyl amines; alkyl benzyl amines; alkyl phenyl amines; alkoxybenzyl amines; allyl aminobenzoates; alkoxy aniline; and other linear primary amines containing from 1 to 50 carbon atoms, preferably 6 to 30 carbon atoms in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are hexylamine, octylamine, dodecylamine, and the like.

The poly(alkenyl-co-maleimide) prior to grafting with maleated polyalklene, preferably has a molecular weight range between about 10,000 and 500,000, and even more typically between about 150,000 and 450,000, where the molecular weight is weight-average ($M_W$).

The polymer of the present invention may be prepared by any means well known in the art for combining such ingredients, such as blending, milling, or internal batch mixing. A rapid and convenient method of preparation comprises heating a mixture of components to a temperature of about 50–290° C.

The polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed-type Brabender mixer, extruding machine, kneader, continuous mixer, etc., is acceptable. The closed-type Brabender mixer is preferable, and mixing in an inactive gas environment, such as nitrogen or argon, is also preferable.

Grafting of the maleated polyalklene and the poly(alkenyl-co-maleimide) is performed by addition of a grafting agent. The preferred grafting agent is a low molecular weight organic compound with at least 2 functional groups capable of crosslking said polymer. Appropriate functional groups include primary amine, secondary amine, carboxyl, formyl, and hydroxyl. The preferred grafting agent is a polyamine, preferably an organic diamine, to a blend of maleated polyproylene and poly(alkenyl-co-maleimide) to partially cross-link the polyalkylene to the poly(alkenyl-co-maleimide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the following formula: $R_1(NH_2)_2$, wherein $R_1$ represents an aliphatic hydrocarbon group having from 2 to 20 carbon atoms, a cycloaliphatic hydrocarbon group having from 4 to 20 carbon atoms, an aromatic hydrocarbon group having from 6 to 20 carbon atoms, or an N-heterocyclic ring having from 4 to 20 carbon atoms, e.g., ethylenediamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclohexylamine; 4,4'-diamino-dicyclohexyl methane; 2,2'-(bis-4-amino-cyclohexyl)-propane; 3,3'-dimethyl-4,4'-diaminodicyclohexyl methane; 1,2-bis-(4-aminocyclohexyl)-ethane; 3,3'5,5'-tetramethyl-bis-(4-aminocyclohexyl)-methane and -propane; 1,4-bis-(2-aminoethyl)-benzene; benzidine; 4,4'-thiodianiline; 3,3'-dimethoxybenzidine; 2,4-diaminotoluene; diaminoditolylsulfone; 2,6-diaminopyridine; 4-methoxy-6-methyl-m-phenylenediamine; diaminodiphenyl ether; 4,4'-bis(o-toluidine); o-phenylenediamine; methylene bis(o-chloroaniline); bis(3,4-diaminophenyl) sulfone; diaminophenylsulfone; 4-chloro-o-phenylenediamine; m-aminobenzyl amine; m-phenylene diamine; 4,4'-$C_1$–$C_6$-dianiline; 4,4'-methylene-dianiline; aniline-formaldehyde resin; trimethylene glycol-di-p-aminobenzoate; bis-(2-aminoethyl)-amine, bis-(3-aminopropyl)amine; bis-(4-aminobutyl)-amine; bis-(6-aminohexyl)-amine, and isomeric mixtures of dipropylene triamine and dibutylene triamine. Mixtures of these diamines may also be used.

Other suitable polyamines for use as grafting agents in the process according to the present invention include bis-(aminoalkyl)-amines, preferably those having a total of from 4 to 12 carbon atoms, such as bis-(2-aminoethyl)amine, bis-(3-aminopropyl)amine, bis-(4-aminobutyl)amine, and isomeric mixtures of dipropylene triamine and dibutylene triamine. Hexamethyl diamine, tetramethylene diamine, and especially 1,12-diaminododecane are preferably used.

The centipede polymers of the present invention may be a glassy material and may therefore have an extender added to the polymer during final processing. Suitable extenders include extender oils and low molecular weight compounds or components, such as the extenders including, but not limited to: naphthenic, aromatic, paraffinic, pthalic, and silicone oils. The preferred extender for the present invention is a pthalic oil. The preferred pthalic oil is di(tridecyl) pthalate from the C. P. Hall Company. This oil is added in the final stages of the preparation of the centipede polymer. The final centipede polymer can contain between 25 and 40% oil and is a thermoreversible elastomer.

After the centipede polymer is formed, it is mixed with an epoxy polymer, preferably a hyperbranched epoxy polymer, to improve the adhesion and damping properties of the polymer gel. Generally, the term hyperbranched herein will mean a highly branched polymer structure with a random morphology and high resistance to crystallization. The hyperbranched epoxy polymer is formed by the reaction of an epoxy prepolymer with a curing agent. Epoxy polymers are typically formed by the reaction of bisphenol A and epichlorhydrin. Epichlorhydrin is reacted with a variety of hydroxy, carboxy, and amino compounds to form monomers with two or more epoxide groups, and these monomers are then used in the reaction with bisphenol A. Examples are the diglycidyl derivative of cyclohexane-1,2-dicarboxylic acid, the triglycidyl derivatives of p-aminophenol and cyanuric acid, and the polylglycidyl derivative of phenolic prepolymers. Epoxidized diolefins are also employed. In the present invention, the epoxy prepolymer which is preferred is poly [(o-cresyl glycidyl ether)-co-formaldehyde].

A variety of coreactants can be used to cure the epoxy resins either through the epoxide or hydroxyl groups. Polyamines are the most common curing agent with reaction involving ring-opening addition of amine. Both primary and secondary amines are used with primary amines being more reactive than secondary amines. Since each nitrogen-hydrogen bond is reactive in the curing reaction, primary and secondary amine groups are bi- and mono-functional respectively. A variety of amines are used as crosslinking agents, including diethylene triamine, triethylene tetramine, 4,4'-diamino-diphenylmethane, and polyaminoamides. The preferred amines for the formation of the epoxy polymer in the present invention are dodecyl amine, dibutyl amine, octadecyl amine, and hexamethyleneimine.

A suitable epoxy polymer, preferably hyperbranced, is formed by reaction of an epoxy resin with a polyamine to such an extent that the system is near the gelation point, but without exceeding the point. A near-gelation polymer can be formed when the degree of interchain reaction, i.e., crosslinking, between the elastomeric molecules nears or approaches the gel point of the polymeric composition. At the gel point, a gel or insoluble polymer fraction forming in a polymeric composition first becomes observable.

Theoretically, a gel corresponds to an infinite network in which polymer molecules have been crosslinked to one another to form a macroscopic molecule. The gel may then be considered one molecule. A gel generally is insoluble in all solvents at elevated temperatures under conditions where polymer degradation does not occur; the non-gel portion of the polymer, often referred to as sol, remains soluble in solvents. For present purposes, near-gelation polymers also can be referred to as near-gel polymers.

When forming a near-gelation polymer, the gel point of the polymeric composition employed to create the near-gelation polymer preferably is determined. Several techniques are known in the art for estimating the gel point of polymeric compositions. Gel point can be determined experimentally by solvent extraction and other techniques described in P. J. Flory, *Principles of Polymer Chemistry* (1953). Gel point also can be approximated by using theoretical calculations as described in, for example, G. Odian, *Principles of Polymerization*, 3d ed., pp. 108–123, (1991). Throughout the presentspecification, the polymeric composition employed to create the near-gelation polymer can be referred to as the prepolymer system.

Although gel point can be discussed in terms of a variety of parameters, determining the ratio of the weight of curative to the weight of prepolymer necessary to reach the gel point can be convenient. Thus, gel point can be represented by the weight of curative necessary to reach gelation, $W_{cg}$, over the weight of prepolymer, $W_p$. Likewise, the point of complete cure can be represented by the weight of curative necessary to reach complete cure, $W_{cc}$, divided by $W_p$. In general, therefore, the extent of any curing reaction can be represented by the weight of curative added, $W_c$, divided by $W_p$. For present purposes, extent of reaction, r, can be represented by $W_c$ over $W_p$. Therefore, the extent of gelation, $r_g$, is $r_g = W_{cg}/W_p$, and the extent of complete cure $r_{cc} = W_{cc}/W_p$.

Once the gel point of the prepolymer is determined, an appropriate amount of curative can be added and reacted with the prepolymer to achieve a near-gelation polymer. When selecting an appropriate amount of curative, the gel point preferably is approached but not exceeded, although the definition of near-gelation polymer broadly includes those reaction products of curative and prepolymer that exceed the gel point without actually reaching complete cure. Thus, the weight ratio employed to create a near-gelation polymer preferably is based on $E=|(r-r_g)/r_g|$ where E is the relative distance to the gel point while r and $r_g$ are defined as above. Since E is an absolute value, E is greater than or equal to 0 and less than or equal to about 0.5, more preferably less than about 0.2, still more preferably less than about 0.1, and even more preferably no more than about 0.05. The foregoing formula involves the absolute value of a number and, therefore, the extent of the reaction (r) is a relative distance (E) both beyond and before the gel point. For example, where the gel point of a particular polymeric composition is about 0.5 parts of curative per part of prepolymer, a near-gel polymer can be obtained by reacting the polymeric composition with about 0.3 or about 0.7 parts of curative per part of the prepolymer (thus, $E=|(0.3-0.5)/(0.5)|=0.4$ or $E=|(0.7-0.5)/(0.5)|=0.4$).

It is frequently desirable to include other additives well known in the rubber art to the compositions of the present application. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl)benzotriazole, nickel di-butyl-di-thiocarbamate, zinc di-butyl-di-thiocarbamate, tris (nonylphenyl)phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably in the range of 1–350 parts of additives or compounding ingredients per 100 parts of the polymer composition.

A reinforcement may be defined as the material that is added to the polymer matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability. Examples of other elastomers and resins include adhesive-like products including Reostomer (produced by Riken-Vinyl, Inc.), hydrogenated polystyrene-(medium or high 3,4)-polyisoprene-polystyrene block copolymers such as Hybler (produced by Kurare, Inc.), polynorbornenes such as Norsorex (produced by Nippon Zeon, Inc.), and the like. In this case the foregoing materials are equally applicable to the instant centipede polymer compositions.

In summary, the molded polymers produced from the blend of the present centipede polymer and epoxy polymer retain elastomeric characteristics and are useful in high damping applications.

Damping is the absorption of mechanical energy by a material in contact with the source of that energy. It is desirable to damp or mitigate the transmission of mechanical energy from, for example, a motor, engine, or power source to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

The compositions of the present invention are favorably used in the manufacturing of any product in which the following properties are advantageous: a degree of softness, heat resistance, decent mechanical properties, elasticity, good adhesion, and/or high damping. The compositions of the present invention can be used in all industry fields, in particular, in the fabrication of automotive parts, tire tread rubbers, household electrical appliances, industrial machinery, precision instruments, transport machinery, constructions, engineering, medical instruments, and tire rubber formulations.

Representative examples of the composition of the present invention are in the fabrication of damping materials and vibration restraining materials. These uses involve connecting materials such as sealing materials, packing, gaskets, and grommets; supporting materials, such as mounts, holders, and insulators; and cushion materials such as stoppers, cushions, and bumpers. These materials are also used in equipment producing vibration or noise and household electrical appliances, such as in air-conditioners, laundry machines, refrigerators, electric fans, vacuums, dryers, printers, and ventilator fans. These materials are also suitable for impact absorbing materials in audio equipment and electronic or electrical equipment, sporting goods, and shoes.

The present invention will also be useful in any application where superior adhesion properties are important. The applications for polymers with high adhesion properties fall into two major categories, coatings and structural. Coatings applications include marine, maintenance, drum, and can coatings. Automotive primer coatings involve epoxy resins with ionic charges that allow for electrodeposition of the resin. Waterborne epoxy coatings have been developed for beer and beverage containers. Structural composites are used in the military (missile casing, tanks), aircraft (rudders, wing skins, flaps), automobiles (leaf springs, drive shafts), and pipe in the oil, gas, chemical, and mining industries.

In the following, the present invention will be described in more detail with reference to non-limitative examples. The following examples and table are presented for purposes of illustration only, and are not to be construed in a limiting sense.

Preparation of Epoxy Hyperbranched Polymers

EXAMPLE 1

35.0 g of poly[(o-cresyl glycidyl ether)-co-formaldehyde] ($M_n$~1080) (~32.4 mmol) was dissolved in 50 mL of toluene. 4.3 g of dodecyl amine (23.2 mmol) was added, followed by 23.0 g of dibutyl amine (178 mmol). The mixture was reacted at 100–150° C. for 6 hours. The product was then heated to 200° C. for 1 hour to drive off volatiles.

EXAMPLE 2

45.8 g of poly[(o-cresyl glycidyl ether)-co-formaldehyde] ($M_n$~1080) (42.4 mmol) was dissolved in 50 mL of toluene. 8.3 g of octadecyl amine (30.8 mmol) was added, followed by 21.05 g of hexamethyleneimine (212.4 mmol). The mixture was reacted for 1 hour at 140° C., kept at 25° C. for 3 days, then heated to 160° C. for 1 hour to drive off volatiles.

EXAMPLE 3

50.0 g of poly[(o-cresyl glycidyl ether)-co-formaldehyde] ($M_n$~540) was dissolved in toluene. 22.5 g octadecyl amine (83.5 mmol) was added followed by 14.4 g of dibutyl amine (108.3 mmol). The mixture was reacted at 140° C. for 4 hours.

EXAMPLE 4

The same reaction as example 3.

Preparation of the PP-grafted Centipede Polymer

EXAMPLE 5

To a 6L kneader-extruder (MXE-6, Jaygo Inc.) equipped with sigma blades was added 2.76 lb. of poly(maleic anhydride-alt-isobutlyene) (from Kurray Co., LTD and with trade name of Isoban-10), 2.18 lb. of octylamine (from BASF, 99% purity) at 54° C. The mixing was started with the blade speed of 25 rpm and the screw speed of 40 rpm for 5 minutes, then the temperature of the mixer was adjusted to rise to 190° C. at a rate of about 3° C. per minute. The mixing was further continued for 2 more hours isothermally at 190° C. Then, 1.24 lb. of maleated polypropylene (from Exxon and with the trade name PO1015) was added into the mixer. The mixing was continued for another 30 minutes. Then, to the mixer was added 23 g of dodecane diamine (from Aldrich, 98% purity). After an additional 15 minutes, a total 3.08 lb of DTDP oil [di(tridecyl)phtalate, from the C. P. Hall Co.] was added to the mixer and the temperature of the mixer was adjusted to 160° C. After another 2 hours, the final product was then extruded through a ¼ inch die. The final product contains 33% of DTDP oil and is a thermoreversible elastomer.

Preparation of High Damping Gels

EXAMPLE 6

A charge of 35 g of the product from the experiment of example 5 was added to a Brabender mixer (~55 g capacity) equipped with a roller blade and nitrogen purging. The mixer was initially set to 160° C. and 60 rpm. After 3 minutes, a charge of 15 g of the product from the experiment of example 1 was added to the mixer. The material was further mixed at those conditions for 17 minutes; then, the agitation was turned off and the mixture was removed from the mixer.

EXAMPLE 7

The experiment from example 6 was repeated.

EXAMPLE 8

The experiment from example 6 was repeated. The total mixing time was 20 minutes.

EXAMPLE 9

Except for a minor change in the materials used, the procedure of example 6 was repeated. In this sample, to the mixer was charged 35 g of example 5 and 15 g of example 2.

EXAMPLE 10

In this example, the procedure of example 6 was repeated with different charges of materials being used. In this sample, to the mixer was charged 35 g of example 5 and 15 g of example 4.

EXAMPLE 11

To the mixer 35 g of example 5 and 15 g of example 3 were charged. The mixing procedure was the same as in example 6.

EXAMPLE 12

To the Brabender mixer, a charge of 25 g of the product from the experiment of example 5 was added. The mixer was initially set to 160° C. and 60 rpm. After 3 minutes, a charge of 25 g of the product from the experiment of example 3 was added to the mixer. After the material was mixed at the same agitation speed for an additional 17 minutes, the agitation was turned off and the mixture was removed from the mixer.

These products were molded into sheets and cylinder buttons at ~160° C. Ring samples were cut from these sheets for tensile measurements. The peeling test is the standard load across a 1-inch section. The details of the physical properties of the final materials are shown in Table 1.

TABLE 1

| Samples | Epoxy Hyperbranch Additive | C.S. 100° C. | Tb/Eb Psi/% | Shore A | Tan δ 23° C. | Peeling Strength on Mylar Surface lb/in | Peeling Strength on PP surface lb/in |
|---|---|---|---|---|---|---|---|
| 5 | None | 49.0% | 260/217 | 30 | 0.60 | 0.196 | 5.968 |
| 6 | Product of example 1 | 45.1% | 162/421 | 6 | 1.43 | 0.976 | 6.358 |
| 7 | Product of example 1 | 47.8% | 138/367 | 6 | 1.47 | 0.943 | 5.103 |
| 8 | Product of example 1 | 42.5% | 227/416 | 6 | 1.53 | 1.167 | 6.176 |
| 9 | Product of example 2 | 54.5% | 244/407 | 5 | 1.09 | 0.249 | 7.403 |
| 10 | Product of example 4 | 44.4% | 128/367 | 6 | 1.33 | — | — |
| 11 | Product of example 3 | 47.2% | 109/202 | 5 | 1.21 | — | — |
| 12 | Product of example 3 | 83.9% | 106/503 | 2 | 1.78 | — | — |

What we claim is:

1. A polymer gel composition comprising:
   a. a maleated polyalkylene grated via a grafting agent to a poly(alkenyl-co-maleimide),
   b. an epoxy polymer and,
   c. optionally, an extender.
   e. an epoxy polymer.

2. The composition of claim 1 wherein said maleimide unit is synthesized by the reaction of maleic anhydride and monoamine.

3. The composition of claim 2 wherein said monoamine is selected from the group consisting of, but not limited to: alkyl amines, alkyl benzyl amines; alkyl phenyl amines; alkoxybenzyl amines; allyl aminobenzoates; alkoxy aniline; and other linear primary amines containing from 1 to 50 carbon atoms in the alkyl and alkoxy substituents.

4. The composition of claim 2 wherein said monoamine is octylamine.

5. The composition of claim 1 wherein said alkenyl unit is selected from the group consisting of vinyl aromatic hydrocarbons, $R_1R_2$ ethylenes, or alkylvinyl ethers.

6. The composition of claim 5 wherein said vinyl aromatic hydrocarbon is selected from the group consisting of styrene, α-methylstyrene, 1-vinylnapthalene, 2-vinylnapthalene, 1-α-methylvinylnaphthalene, 2-α-methylvinylnaphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl aromatic hydrocarbons and combinations thereof.

7. The composition of claim 5 wherein said vinyl aromatic hydrocarbons are either styrene or α-methylstyrene.

8. The composition of claim 5 wherein said $R_1R_2$ ethylene-contributed monomer unit is selected from the group consisting of ethylene, propylene, butylene, isobutylene, pentene, hexene, and heptene.

9. The composition of claim 5 wherein said $R_1R_2$ ethylene is isobutylene.

10. The composition of claim 5 wherein said alkylvinyl ether is selected from the group consisting of methylvinyl ether, ethylvinyl ether, propylvinyl ether, butylvinyl ether, and other alkylvinyl ether wherein the said alkyl substituent has up to about 12 carbon atoms.

11. The composition of claim 10 wherein said alkylvinyl ether is methylvinyl ether.

12. The composition of claim 1 wherein said grafting agent is comprised of a low molecular weight organic compound having 1 or more functional groups selected from the group Consisting of primary amine, secondary amine, carboxyl, formyl, and hydroxyl.

13. The composition of claim 12 wherein said grafting agent is an amine selected from the group consisting of ethylenediamine; 1,2- and 1,3-propylene diamine; 1,4-diaminobutane; 2,2-dimethyl-1,3-diaminopropane; 1,6diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclo-hexylamine; 3-aminomethyl-3,5,5-trimethyl-cyclohexylamine; 1,2-bis-(amino-methyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methy-4-aminoisopropyl-cyclo-hexylamine; 4,4'-diamino-dicyclohexylmethane; 4,4'-diamino-dicyclohexyl methane; 2,2'-(bis-4-amino-cyclohexyl)-propane; 3,3'-dimethyl4,4'-diaminodicyclohexyl methane; 1,2-bis-(4-aminocyclohexyl)-ethane; 3,3',5,5'-tetramethyl-bis-(4aminocyclohexyl)-methane and -propane; 1,4-bis-(2-aminoethyl)-benzene; benzidine; 4,4'-thiodianiline; 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; methylenebis(o- chloroaniline); bis(3,4-diaminophenyl)sulfone; diaminodiphenylsulfone; 4-chloro-c-phenylenediamine; m-aminobenzylamine; m-phenylenediamine; 4,4'-$C_1$–$C_6$-dianiline; 4,4'-methylene-dianiline; aniline-formaldehyde resin; triethylene glycol di-p-aminobenzoate; bis-(2-aminoethyl)-amine, bis-(3-aminopropyl)-amine, bis-(4-aminobutyl)-amine; bis-(6-aminohexyl)-amine, and isomeric mixtures of dipropylene triamine, dibutylene triamine, and mixtures thereof.

14. The composition of claim 1 wherein said polyalkylene is grafted.

15. The composition of claim 1 wherein the monomer from which the alkylene moiety of said maleated polyalkylene is formed is selected from the group consisting ethylene, propylene, and mixtures thereof.

16. The composition of claim 1 wherein said extender is an oil.

17. The composition of claim 1 wherein the epoxy polymer is a hyperbranched polymer.

18. The composition of claim 17 wherein said hyperbranched polymer is the reaction product of an epoxy prepolymer and a crosslinking agent, said hyperbranched polymer having a physical state relative to the gelation point of a crosslinked polymer defined by $0 \leq |(r-r_g)/r_g| \leq 0.5$ where r is the weight ratio of said crosslinking agent to said epoxy prepolymer and $r_g$ is the weight ratio of said crosslinking agent to said epoxy prepolymer at the gelation point of the crosslinked polymer.

19. The composition of claim 1 having hysteresis values at greater than 20° C. of tan δ greater than 1.0.

20. A polymer gel comprising:

a. a maleated polyalkylene grated via a grafting agent to a centipede polmer selected from the group consisting of poly(alkenyl-co-maleimide); poly($R_1R_2$ethylene-co-maleimide) and poly(alkylylvinyl ether-co maleimide), b. an epoxy polymer and, c. optionally, and extender.

* * * * *

UNITED STATES PATENT AND TRADEMARK OFFICE
CERTIFICATE OF CORRECTION

PATENT NO. : 6,384,134 B1
DATED : May 7, 2002
INVENTOR(S) : James E. Hall et al.

It is certified that error appears in the above-identified patent and that said Letters Patent is hereby corrected as shown below:

Column 10,
Line 49, "1,6diaminohexane" should read -- 1,6-diaminohexane --
Line 58, "dicyclohexylmethane" should read -- dicyclohexyl methane --
Line 59, "3,3'-dimethyl4,4'-" should read -- 3,3'-dimethyl-4,4'- --
Line 63, "(4aminocyclohexyl)-methane" should read -- (4-aminocyclohexyl)-methane --

Column 11,
Line 2, "-c-" should read -- -0- --
Line 14, "group consisting" should read -- group consisting of --

Column 12,
Line 13, "grated" should read -- grafted --
Line 15, "poly(alkenyl-co-maleimide)" should read -- poly(alkenylvenzene-co-maleimide) --
Line 16, "poly(alkylylvinyl ether-co maleimide" should read -- poly(alkylvinyl ether-co-maleimide --

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,384,134 B1  
DATED        : May 7, 2002  
INVENTOR(S)  : James E. Hall et al.

Page 1 of 1

It is certified that error appears in the above-identified patent and that said Letters Patent is hereby corrected as shown below:

Column 10,  
Line 49, "1,6diaminohexane" should read -- 1,6-diaminohexane --  
Line 58, "dicyclohexylmethane" should read -- dicyclohexyl methane --  
Line 59, "3,3'-dimethyl4,4'-" should read -- 3,3'-dimethyl-4,4'- --  
Line 63, "(4aminocyclohexyl)-methane" should read -- (4-aminocyclohexyl)-methane --

Column 11,  
Line 2, "-c-" should read -- -0- --  
Line 14, "group consisting" should read -- group consisting of --

Column 12,  
Line 13, "grated" should read -- grafted --  
Line 15, "poly(alkenyl-co-maleimide)" should read -- poly(alkenylbenzene-co-maleimide) --  
Line 16, "poly(alkylylvinyl ether-co maleimide" should read -- poly(alkylvinyl ether-co-maleimide --

This certificate supersedes Certificate of Correction issued April 8, 2003.

Signed and Sealed this

Twenty-seventh Day of April, 2004

JON W. DUDAS  
*Acting Director of the United States Patent and Trademark Office*